United States Patent [19]
Omura et al.

[11] Patent Number: 5,294,945
[45] Date of Patent: Mar. 15, 1994

[54] LASER BEAM OPTICAL SCANNING SYSTEM AND LASER PRINTING PROVIDED WITH THE LASER BEAM OPTICAL SCANNING SYSTEM

[75] Inventors: Kunihiko Omura; Akiyoshi Hamada; Satoru Ono; Hiromu Nakamura, all of Toyokawa, Japan

[73] Assignee: Minolta Camera Kabushiki Kaisha, Japan

[21] Appl. No.: 66,504

[22] Filed: May 24, 1993

[30] Foreign Application Priority Data

May 26, 1992 [JP] Japan .................................. 4-133659

[51] Int. Cl.⁵ .......................... B41J 2/435; H04N 1/21
[52] U.S. Cl. ...................................................... 346/408
[58] Field of Search ................ 346/108, 76 L, 102 R, 346/1.1, 168; 358/296, 298, 300, 302

[56] References Cited

U.S. PATENT DOCUMENTS

| | | | |
|---|---|---|---|
| 4,662,004 | 4/1987 | Fredriksen et al. | 455/607 |
| 5,212,501 | 5/1993 | Nakamura et al. | |
| 5,222,037 | 6/1993 | Kubo et al. | 346/153.1 |

FOREIGN PATENT DOCUMENTS

| | | |
|---|---|---|
| 344086 | 2/1991 | Japan . |
| 378722 | 4/1991 | Japan . |

Primary Examiner—Mark Reinhart
Attorney, Agent, or Firm—Price, Gess & Ubell

[57] ABSTRACT

A laser source unit in which a laser diode is located at a focal point of a Fresnel lens using refraction and diffraction. The laser diode emits a laser beam in accordance with a control signal generated by a driving circuit. The laser diode is driven such that defocus on an image surface caused by a rise in the temperature of the laser diode can be kept in a tolerable degree.

20 Claims, 8 Drawing Sheets

LASER BEAM OPTICAL SCANNING SYSTEM AND LASER PRINTING PROVIDED WITH THE LASER BEAM OPTICAL SCANNING SYSTEM

BACKGROUND OF THE INVENTION

1. Field of the Invention

The present invention relates to a laser beam optical scanning system and to a laser printer provided with the laser beam optical scanning system.

2. Description of Related Art

In a laser beam optical scanning system which is installed in an electrophotographic laser printer to write an image on a photosensitive drum, a laser diode has been used as a light source. Since a laser beam emitted from the laser diode is a divergent pencil of rays, a convergent lens (collimator lens) is disposed in front of the laser diode so as to change the divergent pencil of rays into a parallel or a convergent pencil of rays.

A Fresnel lens has been developed. The Fresnel lens has a sawtooth surface and has a pattern of concentric circles which are pitched by microns and zones among which are alternately transparent and opaque. The Fresnel lens uses refraction and diffraction and bends incident rays at the alternately transparent and opaque zones. The Fresnel lens changes a parallel pencil of rays into a convergent pencil of rays and changes a divergent pencil of rays emitted from a focal point of the Fresnel lens into a parallel pencil of rays.

It is possible to install the Fresnel lens in a laser source unit instead of the collimator lens. In this case, however, there is a problem that a change in the optical performance (defocus) is caused by a change in the wavelength of the laser beam emitted from the laser diode. The wavelength of the laser beam emitted from the laser diode changes when the temperature of the laser diode changes. Additionally, a rise in the temperature of the circumstances lowers the emission output of the laser diode, and in order to make up for the fall in the emission output of the laser diode, the laser diode must be supplied with a larger driving current. The supply of a larger current increases the heat value of the laser diode, and consequently the laser diode emits a laser beam with a longer wavelength. Since the Fresnel lens uses diffraction, the Fresnel lens changes its focal length with a change in the wavelength of the laser beam. The change in the focal length of the Fresnel lens changes the size of the beam spot on the photosensitive drum, which degrades the picture quality.

SUMMARY OF THE INVENTION

An object of the present invention is to provide a laser beam optical scanning system and a laser printer wherein defocus on a light receiving surface can be kept in such a degree not as to be a practical problem though a diffracting member for diffracting and converging a laser beam is used.

In order to attain the object, a laser beam optical scanning system according to the present invention comprises a laser diode, a diffracting member, scanning means and driving means for driving the laser diode at a duty factor $\gamma$. A variation in the duty factor $\gamma$ meets a condition indicated by the following expression:

$$K\Delta\gamma < \frac{f_{co}\sqrt{(D_1/D_0)^2 - 1}}{4f_H^2/\pi D_0^2}$$

K: natural constant of the laser diode
$D_1$: tolerable maximum diameter of a beam spot on a light receiving surface
$D_0$: diameter of a beam spot on the light receiving surface when the laser diode emits a laser beam with a designed wavelength
$f_H$: focal length of the scanning means In the structure, even when the temperature of the laser diode changes, defocus on the light receiving surface caused by the change does not come to such a degree as to be a practical problem.

Another laser beam optical scanning system according to the present invention comprises a laser diode, a diffracting member, scanning means and driving means for driving the laser diode continuously for a time a of a scanning period T and intermittently for the rest of the scanning period T. The time a meets a condition indicated by the following expression:

$$T\left(1 - \frac{\Delta\lambda_{MAX}}{K}\right) < a$$

$\Delta\lambda_{MAX}$: tolerable maximum variation in a wavelength of the laser beam emitted from the laser diode
K: natural constant of the laser diode In the structure, even when the wavelength of the laser beam emitted from the laser diode changes with a rise in the temperature of the laser diode, defocus on a light receiving surface does not come to such a degree as to be a practical problem.

A laser printer according to the present invention comprises a photosensitive member, a laser diode, a diffracting member, scanning means and driving means for driving the laser diode to emit a laser beam in accordance with image data for entirely a time of irradiating an image-writing area on a surface of the photosensitive member and to emit a laser beam regularly for a time a within a time of irradiating a non-image-writing area on the surface of the photosensitive member. Thus, by driving the laser diode to emit a laser beam regularly in a non-image-writing area, the temperature of the laser diode is kept in a certain degree at all times. The time a of the regular emission of the laser diode is determined such that defocus on the surface of the photosensitive member caused by a change in the wavelength of the laser beam emitted from the laser diode with a rise in the temperature of the laser diode will be in a tolerable degree. Accordingly, variations in the temperature of the laser diode with the modulation of the laser diode in accordance with image data will be small, and defocus can be kept in a tolerable degree.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

An exemplary laser beam optical scanning system according to the present invention is hereinafter described with reference to the accompanying drawings.

Figure 1:
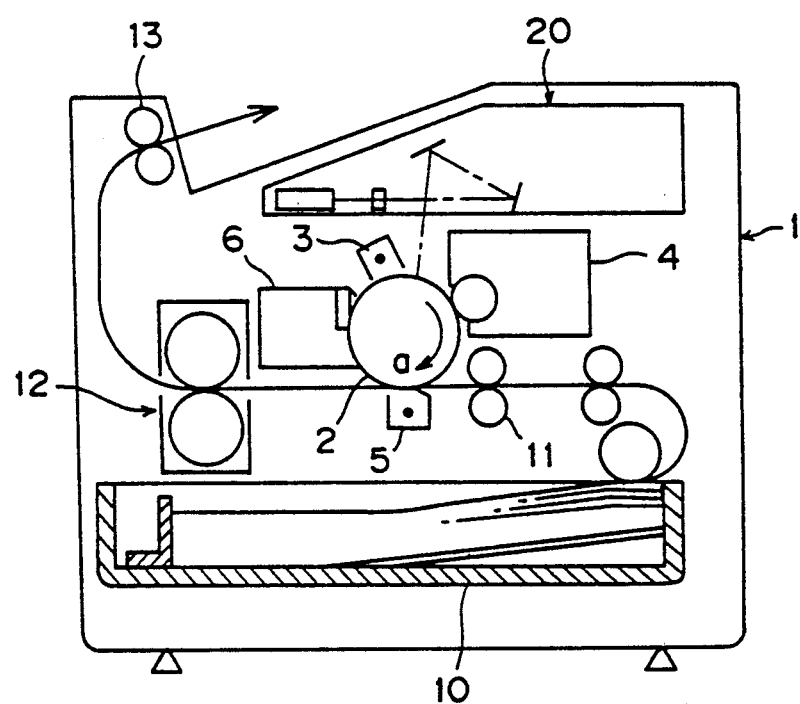
FIG. 1 is a schematic view of a laser printer according to the present invention.

FIG. 1 is a sectional view of a laser printer. A photosensitive drum 2 is disposed substantially in the center of a printer body 1 such that it is rotatable in a direction indicated with arrow a. Around the photosensitive drum 2, there are provided an electric charger 3, a developing device 4, a transfer charger 5 and a residual toner cleaner 6. A laser beam optical scanning system 20 is disposed above the photosensitive drum 2. The surface of the photosensitive drum 2 is charged by the electric charger 3 to have a specified potential uniformly and is exposed to a laser beam from the optical scanning system 20, whereby a specified image is recorded on the photosensitive drum 2 as an electrostatic latent image. The electrostatic latent image is developed into a toner image by the developing device 4.

Meanwhile, a recording sheet is fed from a feed cassette 10 disposed in a lower part of the printer body 1 and transported to a transfer section via a timing roller pair 11. The sheet receives the toner image at the transfer section and is fed to a fixing device 12, where the toner image is fixed on the sheet. Then, the sheet is ejected onto the upper surface of the printer body 1 through an ejection roller pair 13.

Figure 2:
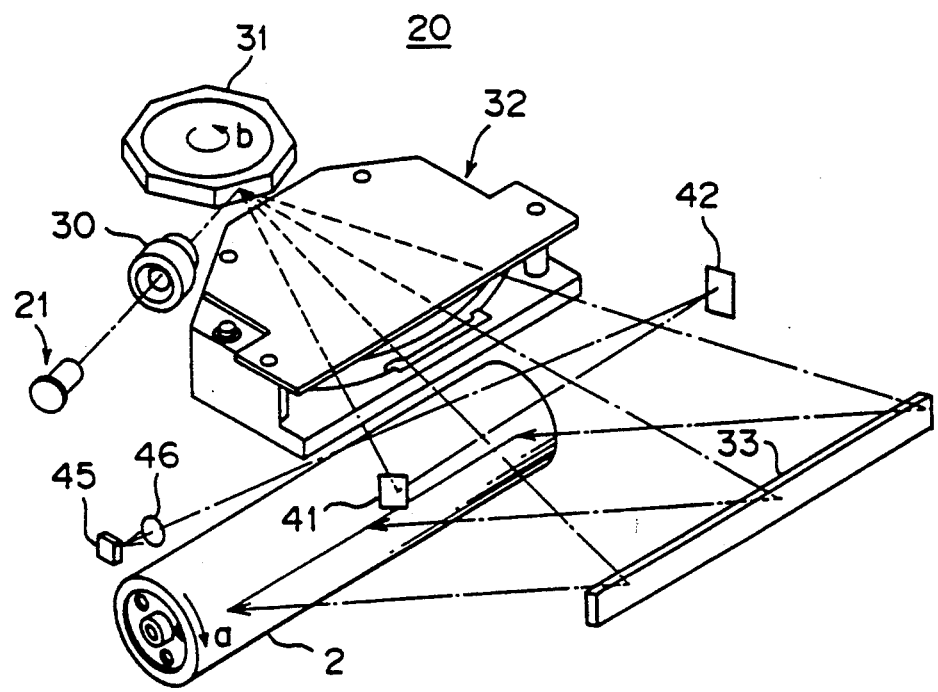
FIG. 2 is a perspective view of a laser beam optical scanning system employed in the laser printer shown in FIG. 1.

FIG. 2 shows the laser beam optical scanning system 20.

The optical scanning system 20 has in a housing (not shown) a light source unit 21, a cylindrical lens 30, a polygonal mirror 31, an fθ lens 32, a plane mirror 33, an SOS sensor 45 for detecting the starting point of scanning, and mirrors 41 and 42 for directing the laser beam to the SOS sensor 45.

The laser beam is emitted from the light source unit 21 (which will be described in detail later) and passes through the cylindrical lens 30 to be imaged on a reflective facet of the polygonal mirror 31. The laser beam is imaged on the facet in a linear form extending in a plane of deflection to be made by the polygonal mirror 31. The polygonal mirror 31 is driven to rotate in a direction indicated with arrow b at a constant speed so as to deflect the laser beam at a constant angular velocity. The deflected laser beam passes through the fθ lens 32 and is reflected by the plane mirror 33. Then, the reflected laser beam passes through a slit (not shown) made in the housing and imaged on the photosensitive drum 2. With the deflection of the laser beam by the polygonal mirror 31, the laser beam is scanned in a direction of the axis of the photosensitive drum 2 at a constant speed, and the scanning in the direction is referred to as main scanning. Additionally, as the photosensitive drum 2 is rotating in the direction of arrow a, the laser beam is scanned in a direction perpendicular to the main scanning direction, and this scanning is referred to as sub scanning.

In the structure, an electrostatic latent image is formed on the photosensitive drum 2 by modulation of the laser beam, and the main and the sub scanning. The fθ lens 32 corrects aberration, and more specifically adjusts the laser beam such that the speed of the main scanning will be constant in any portion of a line from the center to the both ends. The cylindrical lens 30 corrects misalignment of the reflective facets of the polygonal mirror 31 in cooperation with the fθ lens 32.

Meanwhile, the laser beam deflected by the polygonal mirror 31 is partly reflected by the mirrors 41 and 42 and enters the SOS sensor 45 through the cylindrical lens 46. The SOS sensor 45 generates an SOS signal, and the starting point of image writing in each line is determined in accordance with the SOS signal.

Figure 3:
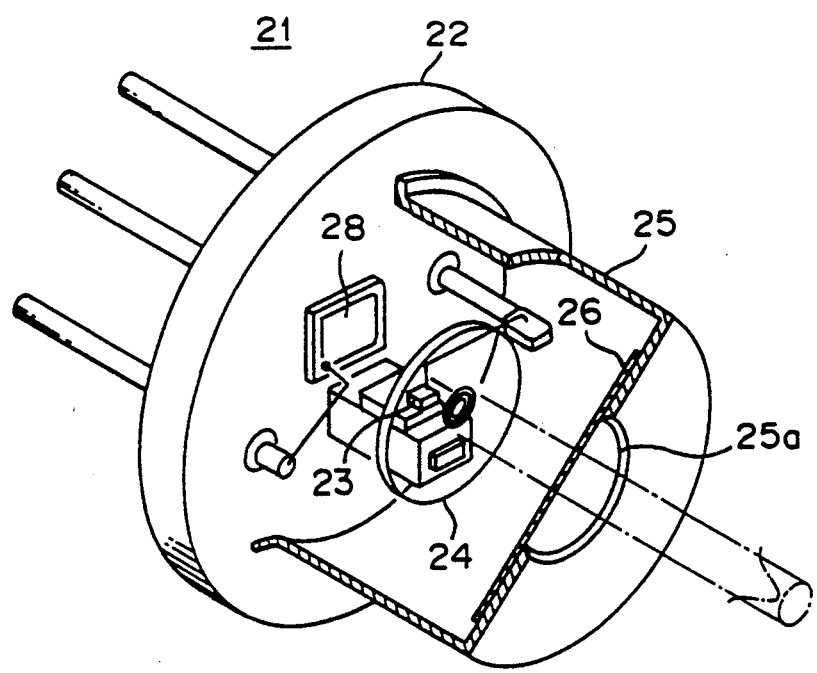
FIG. 3 is a partially cutaway view of a light source unit provided in the laser beam optical scanning system shown in FIG. 2.

Now referring to FIG. 3, the light source unit 21 is described.

Figure 4:
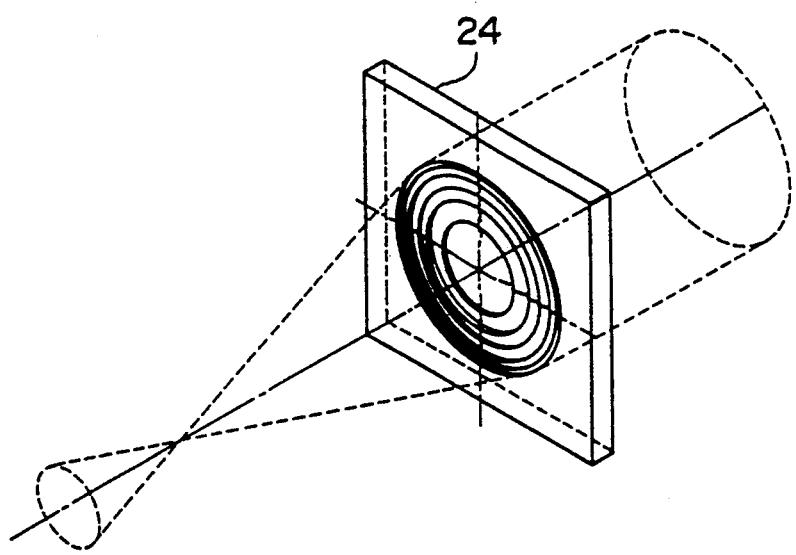
FIG. 4 is a perspective view of a Fresnel lens showing its converging effect.

The light source unit 21 comprises a base 22, a laser diode 23, a Fresnel lens 24, a metal cover 25 and a photodiode 28 for monitoring the quantity of light. The cover 25 has an emergent window 25a with a protection glass 26 fitted therein. The laser diode 23, when it is supplied with a current of a specified value, emits a divergent light from its composition plane. The Fresnel lens 24 is a diffracting member which has a structure of diffraction grating. More specifically, the Fresnel lens 24 has a pattern of concentric circles pitched by microns on a sawtooth surface, and zones among the concentric circles are alternately transparent and opaque. The Fresnel lens 24 has a refracting effect and a diffracting effect, and a light is bent at the alternately transparent and opaque zones. The Fresnel lens 24 changes a parallel pencil of rays incident thereto into a convergent pencil of rays converging on its focal point. The Fresnel lens 24 also changes a divergent pencil of rays emitted from its focal point and incident thereto changes into a parallel pencil of rays (see FIG. 4).

Accordingly, if the light emitting portion (composition plane) of the laser diode 23 is placed at the focal point of the Fresnel lens 24, the divergent light emitted from the laser diode 23 is changed into a parallel pencil of rays by the Fresnel lens 24. Consequently, the light source unit 21 emits a parallel pencil of rays toward the cylindrical lens 30.

The Fresnel lens 24, which is made of polycarbonate, is so made as to handle a laser beam with a wavelength of 780 nm.

Since the Fresnel lens 24 is extremely small and light, it can be mounted in a package densely together with the laser diode 23, the photodiode 28 and other components. In a conventional laser source unit, a single glass aspherical lens has been used as a collimator lens. Compared with the conventional light source unit, the light source unit 21 having the Fresnel lens 24 is small. Additionally, since the Fresnel lens 24 is mounted in a package together with the other components of the laser source unit 21, positioning of the laser diode 23 and the Fresnel lens 24 is not necessary in installing the light source unit 21 in an optical system. Mass production of the Fresnel lens 24 is possible by adopting a molding method, and this method does not require a milling process.

The laser diode 23 has a characteristic that the wavelength of the laser beam emitted therefrom changes with a change in the heating value of the light emitting portion and with a change in the temperature of the circumstances. The Fresnel lens 24 having a diffracting effect is sensitive to the wavelength of the laser beam, and its focal length changes with even a slight change in the wavelength. In the light of the whole laser beam optical scanning system 20, a slight change in the focal length of the Fresnel lens 24 is magnified by the optical elements 30, 31, 32 and 33, and consequently, defocus on the surface of the photosensitive drum 2 occurs.

This problem is hereinafter analyzed.

The focal length of the Fresnel lens 24 changes with a change in the wavelength of the laser beam emitted from the laser diode 23 with a relation indicated with the following expression:

$$f\lambda = f'\lambda' \tag{1}$$

$$f' = (\lambda/\lambda')f \tag{1a}$$

$\lambda$: designed wavelength of the laser beam
$\lambda'$: wavelength of the laser beam after a change
$f$: designed focal length of the Fresnel lens
$f'$: focal length of the Fresnel lens after the change Defocus on the photosensitive drum 2 caused by the change in the focal length is expressed as follows: in respect with the main scanning direction, $$\Delta X_H = (f_H/f_{CO})^2 \Delta x \tag{2}$$

$\Delta X_H$: degree of defocus (variation in the location of the image point of the optical scanning system)
$\Delta x$: variation in the location of the object point of the Fresnel lens
$f_H$: focal length of the optical scanning system
$f_{CO}$: focal length of the Fresnel lens in respect with the sub scanning direction, $$\Delta X_V = \beta^2 (f_{CY}/f_{CO})^2 \Delta x \tag{3}$$

$\Delta X_V$: degree of defocus (variation in the location of the image point of the optical scanning system)
$\beta$: lateral magnification of the optical scanning system
$f_{CY}$: focal length of the cylindrical lens The relation between the size of a beam spot on the photosensitive drum 2 and the defocus $\Delta X_H$ can be expressed as follows:

$$D/D_o = \sqrt{1 + (4\lambda \Delta X_H/\pi D_o^2)^2} \tag{4}$$

$D_0$: diameter of the beam spot ($1/e^2$) on the photosensitive drum when the laser beam has the designed wavelength $\lambda$
$D$: diameter of the beam spot ($1/e^2$) on the photosensitive drum when the defocus $\Delta X_H$ occurs A change in the wavelength of the laser beam emitted from the laser diode 23 influences the main scanning more strongly than the sub scanning. Practically, it is required to prevent defocus, that is, an enlargement of the beam spot, in the main scanning direction.

If the beam spot on the photosensitive drum 2 is tolerated to be enlarged to have a diameter $D_1$ in the main scanning direction ($D < D_1$), a condition thereof can be expressed as follows:

$$\sqrt{1 + (4\lambda \Delta X_H/\pi D_o^2)^2} < D_1/D_o \tag{4a}$$

A variation $\Delta x$ in the location of the object point of the Fresnel lens 24 when the wavelength of the laser beam changes from $\lambda$ to $\lambda'$ is expressed as follows:

$$\Delta x = \{(\lambda' - \lambda)/\lambda\} \cdot f_{CO} \tag{5}$$

By substituting the expression (5) into the expression (2), the following expression can be obtained:

$$\Delta X_H = \{(f_H/f_{CO})^2(\lambda' - \lambda)/\lambda\} \cdot f_{CO} \tag{2a}$$

By substituting the expression (2a) into the expression (4a), the following expression can be obtained:

$$f_{co} > \frac{(4f_H^2/\pi D_o^2) \Delta \lambda}{\sqrt{(D_1/D_o)^2 - 1}} \tag{6}$$

$$\Delta \lambda = \lambda' - \lambda$$

In this embodiment, a variation $\Delta\lambda$ in the wavelength of the laser beam is dealt with, and the expression (6) can be changed into the following expression:

$$\Delta \lambda < \frac{f_{co}\sqrt{(D_1/D_o)^2 - 1}}{4f_H^2/\pi D_o^2} \tag{6a}$$

Figure 5:
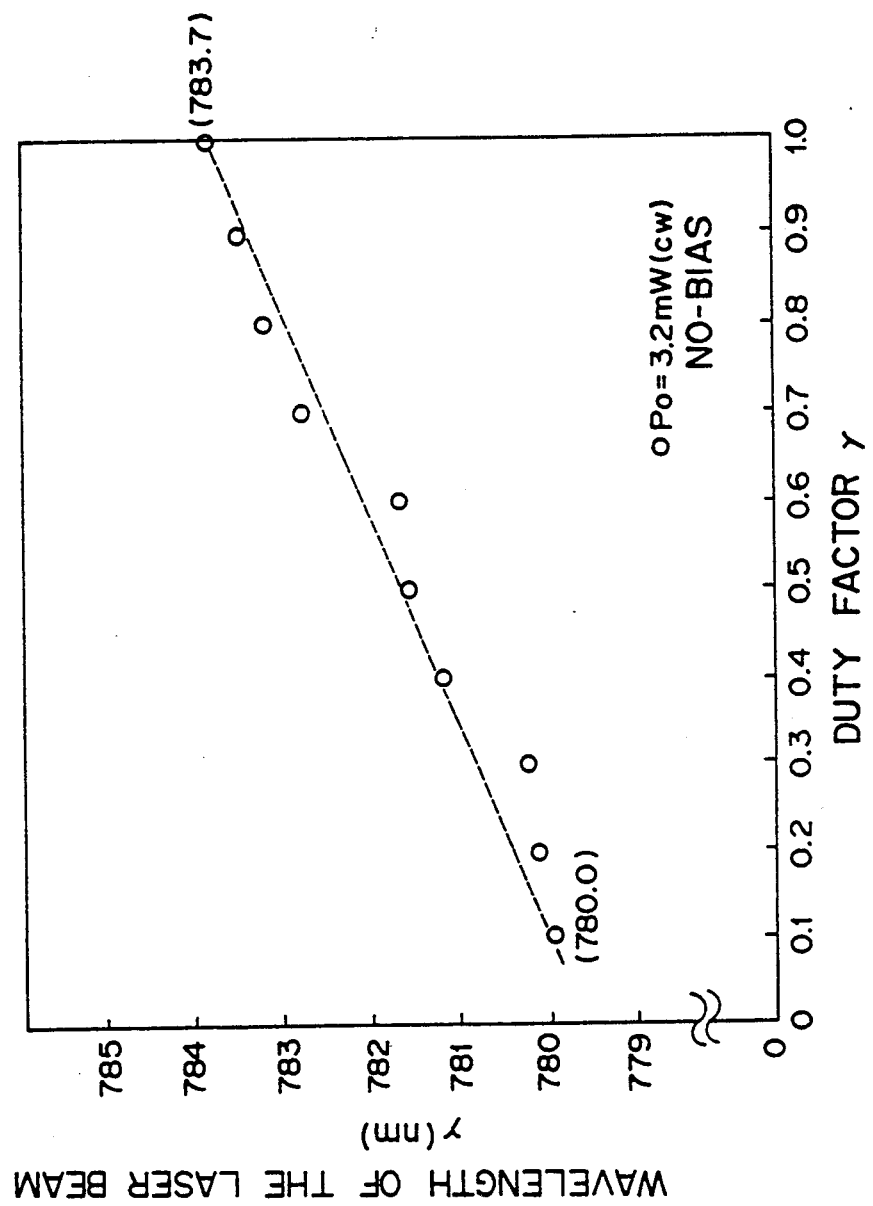
FIG. 5 is a graph showing a relation between the duty factor of the optical scanning system and the wavelength of the laser beam emitted from the laser diode.

Incidentally, as shown in FIG. 5, the duty factor $\gamma$ of the optical scanning system 20 has a correlation with the wavelength $\lambda$ of the laser beam emitted from the laser diode 23. The duty factor $\gamma$ means a ratio of a period of the on-state of the laser diode 23 to a scanning period T of the laser beam optical scanning system 20. The graph of FIG. 5 indicates a result in conditions that the emission output $P_o$ of the laser diode 23 is 3.2 mW and that a bias is not applied. As is apparent from this graph, a relation expressed by the following expression exists between the duty factor $\gamma$ and the wavelength $\lambda$ of the laser beam:

$$\lambda = \lambda_{const} + K\gamma \tag{7}$$

$\lambda_{const}$: wavelength of the laser beam when the duty factor $\gamma$ is 0
$K$: natural constant of the laser diode From the expression (7), the following expression which expresses the relation between a variation $\Delta\lambda$ in the wavelength $\lambda$ of the laser beam and a variation $\Delta\gamma$ in the duty factor $\gamma$ can be obtained:

$$\Delta\lambda = K\Delta\gamma \tag{7a}$$

By substituting the expression (7a) into the expression (6a), the following expression is obtained:

$$K\Delta\gamma < \frac{f_{co}\sqrt{(D_1/D_0)^2 - 1}}{4f_H^2/\pi D_o^2} \tag{8}$$

Next, a variation $\Delta\gamma$ in the duty factor $\gamma$ of the optical scanning system 20 is analyzed.

Each scanning period T of the laser beam optical scanning system 20 includes not only a period for forming an image in an image-writing area in accordance with image data but also a period for monitoring the output of the laser diode 23 and detecting an SOS signal in a non-image-writing area. In the image-writing area, the laser diode 23 emits a light in accordance with image data, and in the non-image-writing area, the laser diode 23 emits a light for a specified time regularly regardless of image data so that the output of the laser diode 23 can be monitored and that the SOS signal can be detected.

The period of the regular emission of the laser diode 23 in the non-image-writing area is denoted by "a". The minimum value $\gamma_{MIN}$ of the duty factor $\gamma$ of the optical scanning system 20 (in a case that all the image data of a scanning line are "0", that is, in a case that the laser diode 23 does not emit a light for image writing of the line at all) is a/T. The maximum value $\gamma_{MAX}$ of the duty factor $\gamma$ of the optical scanning system 20 (in a case that all the image data of a scanning line are "1", that is, in a case that the laser diode 23 continuously emits a light entirely in the image-writing area of the line) is approximately 1. Accordingly, the maximum variation $\Delta\gamma_{MAX}$ in the duty factor $\gamma$ of the optical scanning system 20 can be expressed as follows:

$$\Delta\gamma_{MAX} = \gamma_{MAX} - \gamma_{MIN} = 1 - (a/T) \tag{9}$$

By substituting the expression (9) into the expression (8), the following expression is obtained:

$$K\left(1 - \frac{a}{T}\right) < \frac{f_{co}\sqrt{(D_1/D_o)^2 - 1}}{4f_H^2/\pi D_o^2} \tag{10}$$

The expression (10) can be changed into the following expression:

$$T\left(1 - \frac{1}{K} \cdot \frac{f_{co}\sqrt{(D_1/D_o)^2 - 1}}{4f_H^2/\pi D_o^2}\right) < a \tag{10a}$$

In order to keep the beam spot D on the photosensitive drum 2 within a specified tolerable range, the period a of the regular emission of the laser diode 23 in the non-image-writing area must meet the condition indicated by the expression (10a). In the left side of the expression (10a), $$\frac{f_{co}\sqrt{(D_1/D_o)^2 - 1}}{4f_H^2/\pi D_o^2}$$

means the maximum tolerable value of a variation $\Delta\lambda$ in the wavelength $\lambda$ of the laser beam.

The above analysis is applied to an example having the following values:

T = 2 msec.;
K = 4.1 (K = $\Delta\lambda/\Delta\gamma$, from FIG. 5, K = (783.7 − 780.0)/(1 − 0.1) = 4.1);
$f_{co}$ = 6 mm;
$D_1/D_0$ = 1.286;
$D_0$ = 0.144(300DPI); and
$f_H$ = 160 mm By substituting these values into the expression (10a), 0.5 < a can be obtained. Accordingly, the period a of the regular emission of the laser diode 23 in the non-image-writing area must be longer than 0.5 msec. In this case, the minimum value $\gamma_{MIN}$ of the duty factor $\gamma$ is 0.25 ($\gamma$ = a/T = 0.5/2).

Figure 6:
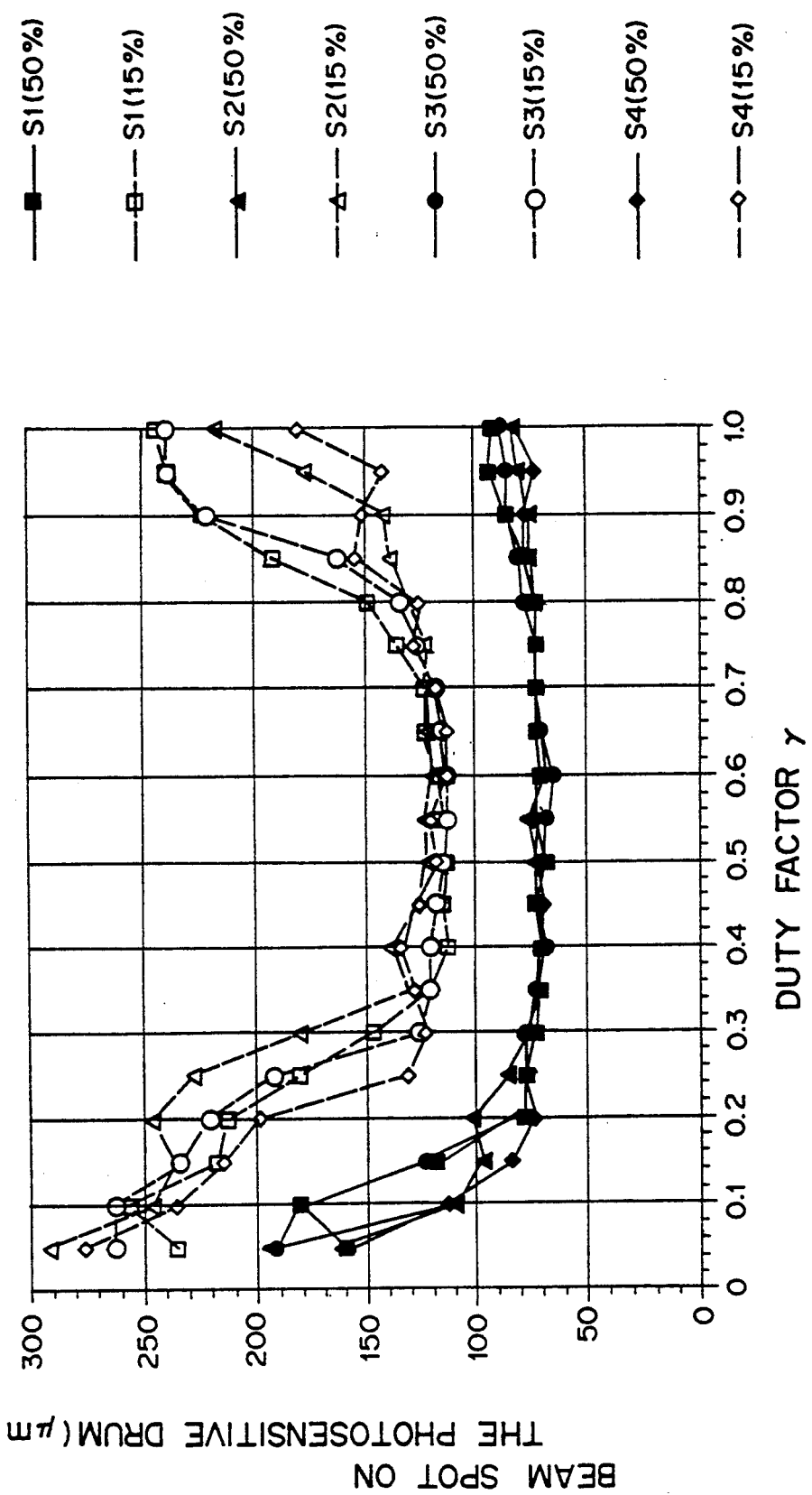
FIG. 6 is a graph showing a relation between the duty factor of the optical scanning system and the diameter of the beam spot on an image surface.

FIG. 6 is a graph showing a relation between the duty factor $\gamma$ and the beam spot on the photosensitive drum 2. FIG. 6 shows measurement results of four samples S1, S2, S3 and S4. The solid line connects solid marks each of which indicates a half-width (the beam spot of an area with intensities of not less than 50% of the center intensity). The dotted line connects hollow marks each of which indicates the beam spot of an area with intensities of not less than 15% of the center intensity. As is apparent from the graph of FIG. 6, the size of the beam spot is substantially fixed while the duty factor $\gamma$ is in a range from 0.25 to 1, whereas the size of the beam spot fluctuates remarkably while the duty factor $\gamma$ is less than 0.25. This is compatible with the calculation result of the above example.

Figure 7:
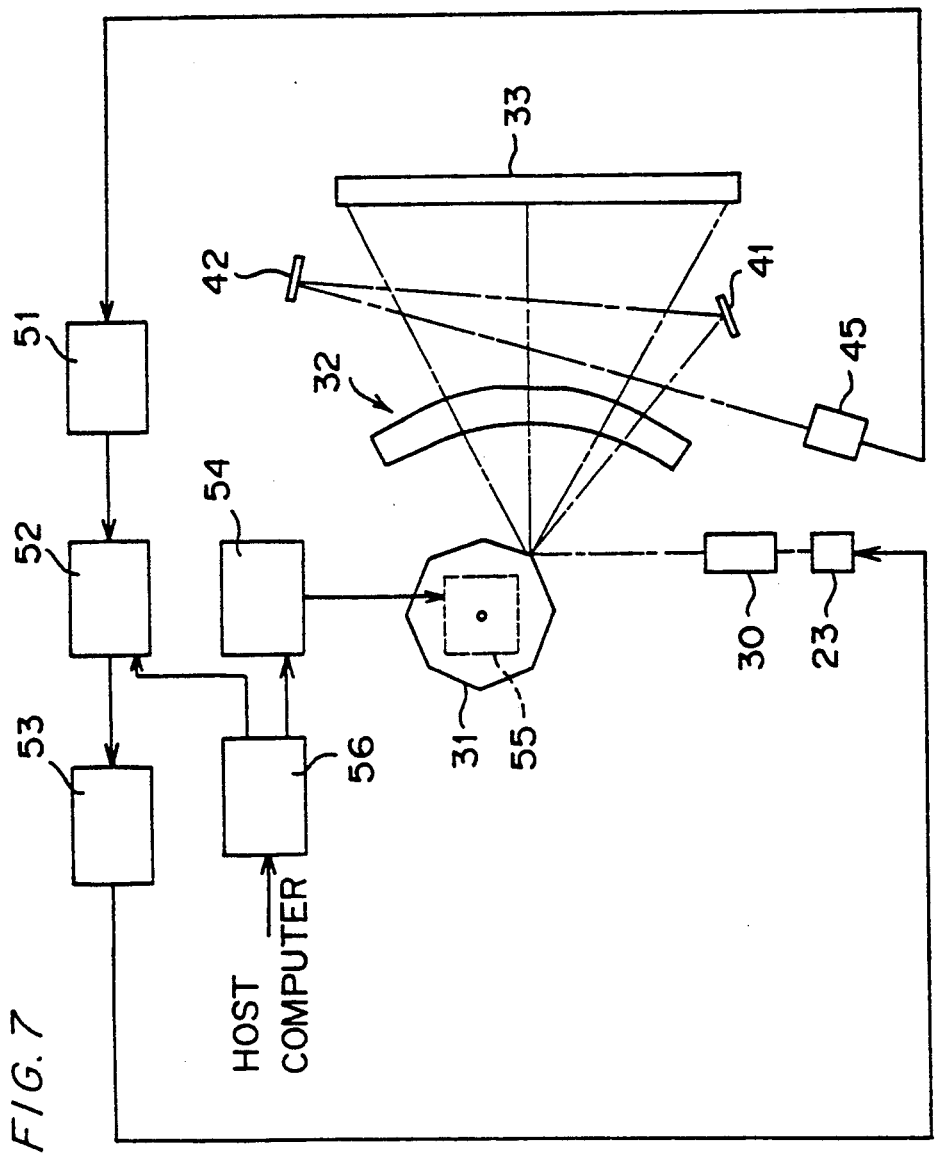
FIG. 7 is an electric circuit diagram of a driving controlling circuit of the optical scanning system.

FIG. 7 shows an exemplary driving circuit of the optical scanning system 20.

The SOS signal generated from the SOS sensor 45 is shaped by a waveform shaping circuit 51 and sent to an image control circuit 52, which will be described in detail later. A signal including image data and printer control commands is sent from a host computer to a data processing unit 56, where the signal is divided into the image data and the printer control commands. The image data are sent to an image control circuit 52, and a printing start command of the printer control commands is sent to a polygonal mirror motor control circuit 54. When the polygonal mirror motor control circuit 54 receives the printing start command, the circuit 54 starts driving a motor 55 of the polygonal mirror 31 and continues driving the motor 55 for a certain time depending on the number of sheets to be printed. In the image control circuit 52, a laser diode control signal (hereinafter referred to as LD control signal) LDATA is formed in accordance with the SOS signal and the image data. The LD control signal LDATA is sent to an LD driving circuit 53, which controls the laser diode 23 in accordance with the LD control signal LDATA.

Figure 8:
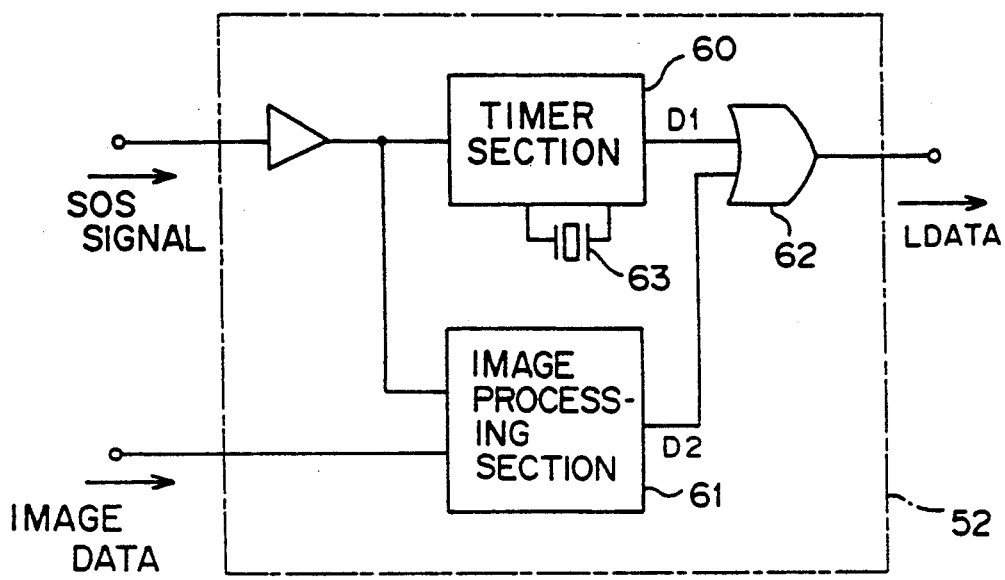
FIG. 8 is an electric circuit diagram of an image control circuit of the driving/controlling circuit.
Figure 9:
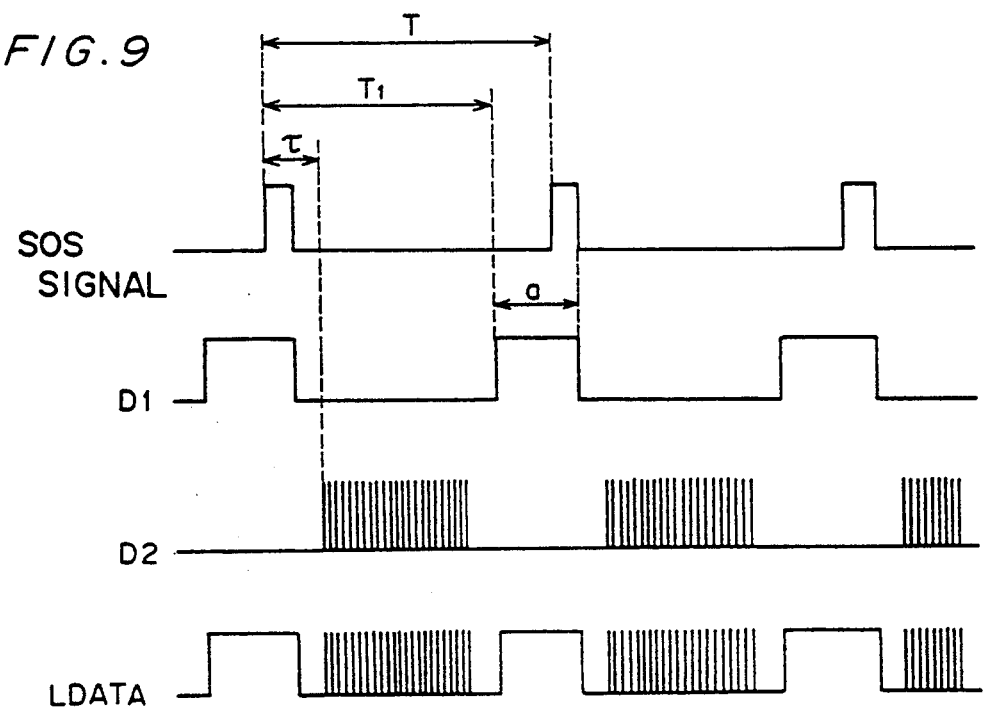
FIG. 9 is a chart showing the output of the image control circuit.

FIG. 8 is a block diagram of the image control circuit 52, and FIG. 9 is a chart showing the output of the image control circuit 52. SOS signals are sent from the waveform shaping circuit 51 at intervals corresponding to the scanning period T of the optical scanning system 20. The image control circuit 52, as shown in FIG. 8, comprises a timer section 60, an image processing section 61 and an OR gate 62.

The timer section 60 is provided with an oscillator 63 made of ceramics or crystal. The timer section 60 regulates a period T1 from the on-edge of an SOS signal to output of a regular emission signal D1 which makes the laser diode 23 emit a light continuously for the specified period a. The regular emission signal D1 is set such that the period a of the regular emission meets the condition indicated by the expression (10a). Thereby, it is unlikely that a rise in the temperature of the laser diode 23 causes a change in the wavelength of the laser beam and further a change in the focal length of the Fresnel lens 24. Consequently, defocus of the optical scanning system 20 can be kept in such a degree not as to be a practical problem.

When a time $\tau$ has passed since the on-edge of an SOS signal, the host computer starts sending one-line image data D2. The regular emission signal D1 and the one-line image data D2 are received by the OR gate 62 and combined with each other to be an LD control signal LDATA. The LD control signal LDATA is sent from the image control circuit 52 to the LD driving circuit 53. The LD driving circuit 53 modulates the laser beam in accordance with the LD control signal LDATA.

Although the present invention has been described in connection with the preferred embodiment above, it is to be noted that various changes and modifications are possible to those who are skilled in the art. Such changes and modifications are to be understood as being within the scope of the invention.

The printer and the laser beam optical scanning system may be so made to have any structure as well as that of the above-described embodiment.

What is claimed is:

1. A laser beam optical scanning system comprising:
   a laser diode;
   a diffracting member for diffracting and converging a laser beam emitted from the laser diode;
   scanning means for scanning the laser beam converged by the diffracting member on a light receiving surface periodically; and
   driving means for driving the laser diode at a duty factor $\gamma$;
   wherein the laser beam optical scanning system meets a condition indicated by the following expression:

$$K\Delta\gamma < \frac{f_{co}\sqrt{(D_1/D_0)^2 - 1}}{4f_H^2/\pi D_0^2}$$

in which expression, $\Delta\gamma$ is a variation in the duty factor $\gamma$, K is a natural constant of the laser diode, $f_{CO}$ is a focal length of the diffracting member, $D_1$ is a tolerable maximum diameter of a beam spot on the light receiving surface, $D_0$ is a diameter of a beam spot on the light receiving surface when the laser diode emits a laser beam with a designed wavelength, and $f_H$ is a focal length of the scanning means.

2. A laser beam optical scanning system as claimed in claim 1, wherein the diffracting member is a Fresnel lens.

3. A laser beam optical scanning system as claimed in claim 2, wherein the Fresnel lens has diffraction grating pitched by microns.

4. A laser beam optical scanning system as claimed in claim 2, wherein the laser diode and the Fresnel lens are assembled into a unit.

5. A laser beam optical scanning system as claimed in claim 2, wherein the laser diode is disposed such that its light emitting portion is located at a focal point of the Fresnel lens.

6. A laser beam optical scanning system as claimed in claim 1, wherein the diffracting member has a structure of diffraction grating pitched by microns.

7. A laser beam optical scanning system comprising:
   a laser diode;
   a diffracting member for diffracting and converging a laser beam emitted from the laser diode;
   scanning means for scanning the laser beam converged by the diffracting member on a light receiving surface with a specified scanning period T; and
   driving means for driving the laser diode continuously for a time a of the scanning period T and intermittently for the rest of the scanning period T;
   wherein the time a meets a condition indicated by the following expression:

$$T\left(1 - \frac{\Delta\lambda_{MAX}}{K}\right) < a$$

in which expression, $\Delta\lambda_{MAX}$ is a tolerable maximum variation in a wavelength of the laser beam emitted from the laser diode, and K is a natural constant of the laser diode.

8. A laser beam optical scanning system as claimed in claim 7, wherein $\Delta\lambda_{MAX}$ meets a condition indicated by the following expression:

$$\Delta\lambda_{MAX} = \frac{f_{co}\sqrt{(D_1/D_0)^2 - 1}}{4f_H^2/\pi D_0^2}$$

in which expression, $f_{CO}$ is a focal length of the diffracting member, $D_1$ is a tolerable maximum diameter of a beam spot on the light receiving surface, $D_0$ is a diameter of a beam spot on the light receiving surface when the laser diode emits a laser beam with a designed wavelength, and $f_H$ is a focal length of the scanning means.

9. A laser beam optical scanning system as claimed in claim 7, wherein the diffracting member is a Fresnel lens.

10. A laser beam optical scanning system as claimed in claim 7, wherein the Fresnel lens has diffraction grating pitched by microns.

11. A laser beam optical scanning system as claimed in claim 9, wherein the laser diode and the Fresnel lens are assembled into a unit.

12. A laser beam optical scanning system as claimed in claim 9, wherein the laser diode is disposed such that its light emitting portion is located at a focal point of the Fresnel lens.

13. A laser beam optical scanning system as claimed in claim 7, wherein the diffracting member has a structure of diffraction grating pitched by microns.

14. A laser printer comprising:
   a photosensitive member;
   a laser diode;
   a diffracting member for diffracting and converging a laser beam emitted from the laser diode;
   scanning means for scanning the laser beam converged by the diffracting member on a surface of the photosensitive member with a specified scanning period T;
   driving means for driving the laser diode to emit a laser beam in accordance with image data for entirely a time of irradiating an image-writing area on the surface of the photosensitive member and to emit a laser beam regularly for a time a within a time of irradiating a non-image-writing area on the surface of the photosensitive member; and
   image forming means for developing an image recorded by the laser beam on the surface of the photosensitive member and transferring the developed image onto a sheet;

wherein the time a of the regular emission of the laser diode is determined such that defocus on the surface of the photosensitive member will be in a tolerable degree.

15. A laser printer as claimed in claim 14, wherein the time a of the regular emission of the laser diode meets a condition indicated by the following expression:

$$T\left(1 - \frac{1}{K} \cdot \frac{f_{co}\sqrt{(D_1/D_o)^2 - 1}}{4f_H^2/\pi D_o^2}\right) < a$$

in which expression, K is a natural constant of the laser diode, $f_{CO}$ is a focal length of the diffracting member, $D_l$ is a tolerable maximum diameter of a beam spot on the surface of the photosensitive member, $D_0$ is a diameter of a beam spot on the surface of the photosensitive member when the laser diode emits a laser beam with a designed wavelength, and $f_H$ is a focal length of the scanning means.

16. A laser printer as claimed in claim 14, wherein the diffracting member is a Fresnel lens.

17. A laser printer as claimed in claim 16, wherein the laser diode and the Fresnel lens are assembled into a unit.

18. A laser printer as claimed in claim 14, further comprising:
- a sensor which is disposed outside the image-writing area and inside an area irradiated by the laser beam; and
- control means for controlling the driving means in accordance with a signal generated by the sensor.

19. A laser printer as claimed in claim 18, wherein the control means controls timing of starting emission of the laser diode in accordance with image data.

20. A laser printer as claimed in claim 18, wherein the control means comprises a timer which starts on receiving a signal from the sensor and control the driving means to start the regular emission of the laser diode when a count of the timer becomes a specified value.

* * * * *